United States Patent
Wang

(10) Patent No.: US 7,783,134 B2
(45) Date of Patent: Aug. 24, 2010

(54) EDGE-ORIENTED INTERPOLATION METHOD AND SYSTEM FOR A DIGITAL IMAGE

(75) Inventor: Hsin Chung Wang, Taipei County (TW)

(73) Assignee: Himax Technologies Limited, Tainan County (TW)

(*) Notice: Subject to any disclaimer, the term of this patent is extended or adjusted under 35 U.S.C. 154(b) by 901 days.

(21) Appl. No.: 11/620,026

(22) Filed: Jan. 4, 2007

(65) Prior Publication Data
US 2008/0165206 A1    Jul. 10, 2008

(51) Int. Cl.
*G06K 9/32* (2006.01)
*G09G 5/00* (2006.01)

(52) U.S. Cl. .................... 382/300; 345/611

(58) Field of Classification Search .......... 382/300, 382/195, 197, 199, 266–270, 274, 275; 345/606, 345/611; 358/525, 530
See application file for complete search history.

(56) References Cited

U.S. PATENT DOCUMENTS

| 6,928,196 | B1 * | 8/2005 | Bradley et al. | 382/300 |
| 7,046,862 | B2 * | 5/2006 | Ishizaka et al. | 382/298 |
| 2007/0236601 | A1 * | 10/2007 | Hahn et al. | 348/441 |

* cited by examiner

*Primary Examiner*—Yon Couso
(74) *Attorney, Agent, or Firm*—WPAT, P.C.; Anthony King

(57) ABSTRACT

An edge-oriented interpolation method is used for enlarging a source image. The region in which each destination pixel in an enlarged image is located is identified as a smooth region, a text region or an edge region, and Sobel edge detection for two adjacent pixels around the destination pixel is performed to obtain two Sobel gradients. When the destination pixel is located in a smooth region, cubic convolution interpolation is performed for the destination pixel with a first slope. When the destination pixel is located in a text region, cubic convolution interpolation is performed for the destination pixel with a second slope. When the destination pixel is located in an edge region, Sobel-based interpolation for the destination pixel is performed with the two Sobel gradients.

20 Claims, 3 Drawing Sheets

EDGE-ORIENTED INTERPOLATION METHOD AND SYSTEM FOR A DIGITAL IMAGE

BACKGROUND OF THE INVENTION

1. Field of the Invention

The present invention relates to digital image processing, and more particularly relates to an edge-oriented interpolation method and system for a digital image, which is especially useful to enhance image interpolation at edge portions of the digital image.

2. Description of the Related Art

Linear interpolation such as bilinear and bi-cubic interpolation is very fundamental to many digital image processing operations such as scaling, rotation, translation and geometric correction. Yet such interpolation fails to settle the blurring or the jagging of edges as a basic problem in image interpolation so far.

Bilinear interpolation has less computation and a low cost, but results in images with unpleasant blurring artifacts, especially when displayed on a large-scale display such as a 42 inch LCD panel or a 42 inch plasma panel. This is mostly due to the color averaging in bilinear interpolation.

In contrast, bi-cubic interpolation is much more complicated and costly. Although bi-cubic interpolation may result in images of a better appearance than bilinear interpolation, bi-cubic interpolation may also introduce jagging edges in the enlarged images, especially near sharp edges such as boundaries of dark colored texts against a light colored background.

Therefore, there is a need for an edge-oriented interpolation method and system for a digital image, which is especially useful to enhance image interpolation at edge portions of the digital image.

SUMMARY OF THE INVENTION

An objective of the present invention is to provide an adaptive edge-oriented interpolation method for an image and a system thereof. In particular, the region in which a destination pixel is located is identified as a smooth region, a text region or an edge region, and the interpolation function assigned to the identified region is applied in the destination pixel color value calculation. As a result, accurate color rendering of a digital image is achieved, even in the presence of an edge portion that has an edge line with an arbitrary tangent direction.

In order to achieve the objective, the present invention discloses an adaptive edge-oriented interpolation method for an image and a system thereof. The region in which each destination pixel in an enlarged image is located is identified as a smooth region, a text-region or an edge region, and Sobel edge detection for two adjacent pixels around the destination pixel is performed to obtain two Sobel gradients. When the location of the destination pixel is in a smooth region, cubic convolution interpolation is performed for the destination pixel with a first slope. When the destination pixel is located in a text region, cubic convolution interpolation is performed for the destination pixel with a second slope. When the location of the destination pixel is in an edge region, Sobel-based interpolation for the destination pixel is performed with the two Sobel gradients.

BRIEF DESCRIPTION OF THE DRAWINGS

The invention will be described according to the appended drawings in which.

DETAILED DESCRIPTION OF THE INVENTION

Figure 1:
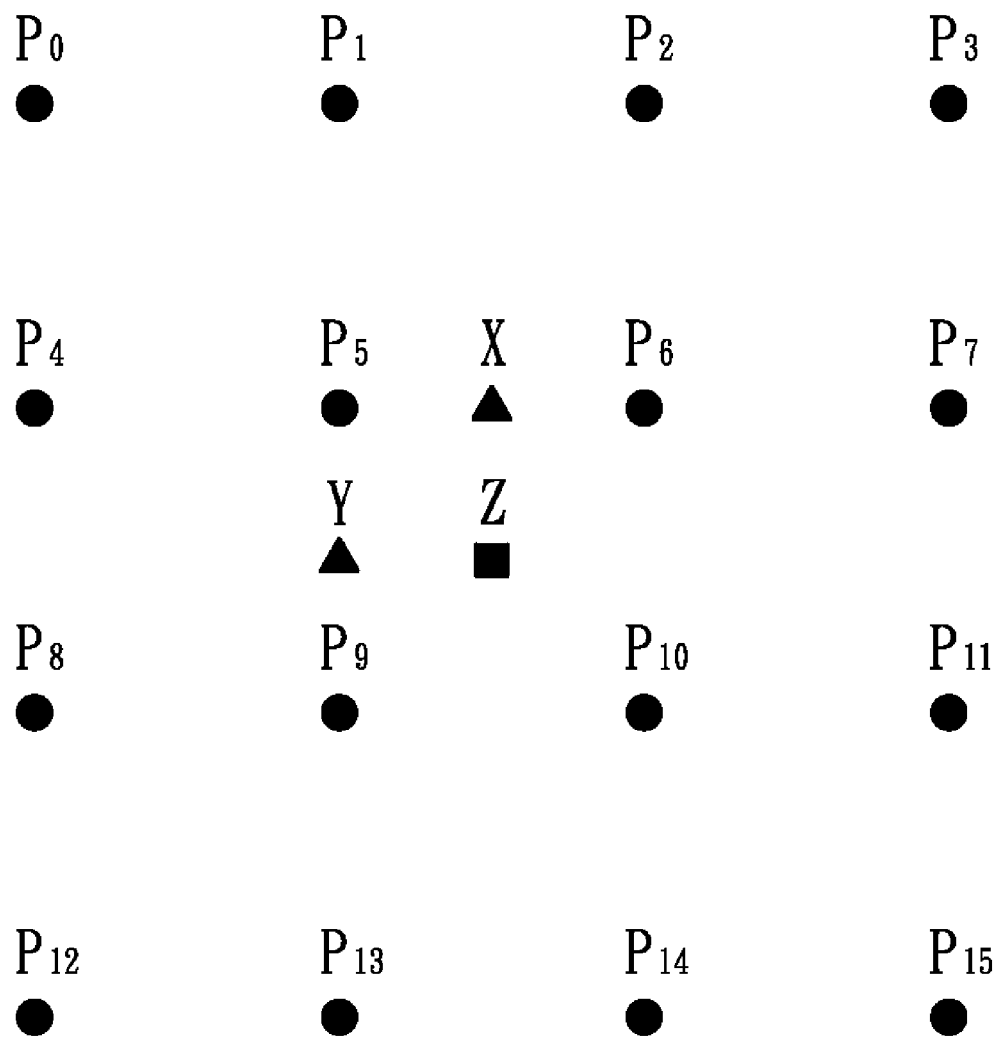
FIG. 1 is an illustration of a matrix of reference pixels and destination pixels on a digital image.

FIG. 1 is an illustration of a matrix of sixteen reference pixels $P_0$-$P_{15}$ and three destination pixels X-Z on a digital image. As shown in FIG. 1, sixteen reference pixels $P_0$-$P_{15}$ arranged into a 4-by-4 matrix are selected from the digital image for interpolation of three destination pixels X-Z. The destination pixel X is expected to be inserted between two neighboring pixels $P_5$ and $P_6$ along a transversal direction, the destination pixel Y is expected to be inserted between two neighboring pixels $P_5$ and $P_9$ along a longitudinal direction, and the destination pixel Z is expected to be inserted between two neighboring pixels $P_5$ and $P_{10}$ along a diagonal direction.

Figure 2:
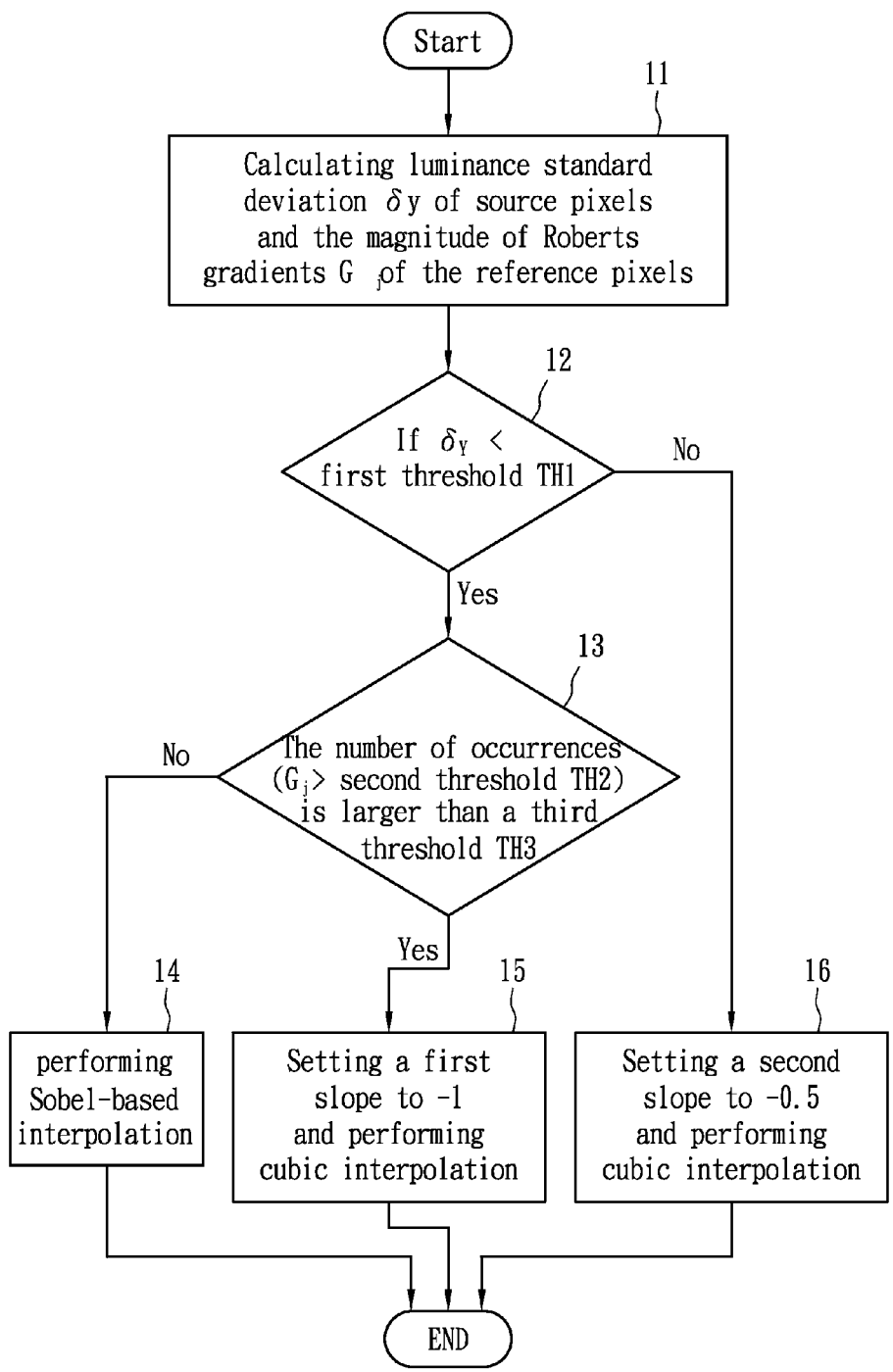
FIG. 2 is a flow chart showing an edge-oriented interpolation method for a digital image in accordance with a preferred embodiment of the invention.

FIG. 2 is a flow chart showing an edge-oriented interpolation method for the digital image in accordance with a preferred embodiment of the invention. Before interpolation for a destination pixel is performed, the region in which the destination pixel is located needs to be identified. Steps 11-13 are used to determine which region the destination pixel is located in. The digital image is classified into a smooth region, a text region or an edge region. Next, the destination pixel can be calculated by performing appropriate interpolation according to the region in which the destination pixel is located in, as shown in Steps 14-16.

As shown in Step 11, the luminance standard deviation $\delta_y$ of the reference pixels $P_0$-$P_{15}$ can be calculated as $$\delta_y = \sum_{i=0}^{15} |x_i - E_x|$$

where $x_i$ is the luminance of the reference pixel $P_i$ and $E_x$ is the mean value of the luminance $x_0$-$x_{15}$. Furthermore, the Robert gradients $G_j$ for each 2-by-2 sub-matrix of the sixteen reference pixels $P_0$-$P_{15}$ can be calculated as $$G_j = \left\| \begin{bmatrix} 1 & 0 \\ 0 & -1 \end{bmatrix} \begin{bmatrix} x_n & x_{n+1} \\ x_{n+4} & x_{n+5} \end{bmatrix} \right\| + \left\| \begin{bmatrix} 0 & 1 \\ -1 & 0 \end{bmatrix} \begin{bmatrix} x_n & x_{n+1} \\ x_{n+4} & x_{n-5} \end{bmatrix} \right\|$$

Where n is selected from the group consisting of 0, 1, 2, 4, 5, 6, 8, 9, 10, and j is an index number of 0-8.

As shown in Step 12, if the luminance standard deviation $\delta_y$ is smaller than a first threshold TH1, the destination pixel X is identified to be located in the smooth region of the digital image. Afterward, as shown in Step 16, the cubic convolution interpolation for the destination pixel X is performed by setting a slope a to −0.5. The cubic convolution interpolation kernel, $w_k$, is a three-degree approximation to a sinc function:

$$w_k = \begin{cases} (a+2)|u|^3 - (a+3)|u|^2 + 1 & 0 \leq |u| \leq 1 \\ a|u|^3 - 5a|u|^2 + 8a|u| - 4a & 1 \leq |u| \leq 2 \\ 0 & 2 \leq |u| \end{cases} \quad \text{Formula (a)}$$

where u is the distance between the destination pixel X and each of the neighboring pixels $P_4$-$P_7$, and a is the slope or first derivative of the kernel at u=1.

The luminance $x_x$ of the destination pixel X can be calculated as a weighted average (or convolution) of the four neighboring pixels based on the kernel, that is:

$$x_X = x_4 w_4 + x_5 w_5 + x_6 w_6 + x_7 w_7.$$

If the luminance standard deviation $\delta_y$ is not smaller than the first threshold TH1, the destination pixel X is identified to be located in either the text region or the edge region of the digital image. Furthermore, as shown in Step 13, if the number of the Robert gradients $G_j$ over a second threshold TH2 is larger than a third threshold TH3, the destination pixel X is identified to be located in the text region of the digital image. The cubic convolution interpolation for the destination pixel X is performed by setting the slope a to −1, as shown in Step 15. In this case, the cubic convolution interpolation kernel, $w_k$, is the same as in Formula (a). The luminance $x_x$ of the destination pixel X can be calculated as a weighted average (or convolution) of the neighboring pixels based on the kernel.

In contrast, if the number of the Robert gradients $G_j$ over the second threshold TH2 is not larger than the third threshold TH3, the destination pixel X is identified to be located in the edge region of the digital image. The Sobel-based interpolation for the destination pixel X is performed with reference to two Sobel gradients $S_5$ and $S_6$ for two neighboring pixels $P_5$ and $P_6$.

The two Sobel gradients $S_5$ and $S_6$ are obtained by performing Sobel edge detection for two neighboring pixels $P_5$ and $P_6$ around the destination pixel X as follows:

$$S_5 = \left\| \begin{bmatrix} -1 & 0 & 1 \\ -2 & 0 & 2 \\ -1 & 0 & 1 \end{bmatrix} \begin{bmatrix} x_0 & x_1 & x_2 \\ x_4 & x_5 & x_6 \\ x_8 & x_9 & x_{10} \end{bmatrix} \right\| + \left\| \begin{bmatrix} 1 & 2 & 1 \\ 0 & 0 & 0 \\ -1 & -2 & -1 \end{bmatrix} \begin{bmatrix} x_0 & x_1 & x_2 \\ x_4 & x_5 & x_6 \\ x_8 & x_9 & x_{10} \end{bmatrix} \right\|;$$

$$S_6 = \left\| \begin{bmatrix} -1 & 0 & 1 \\ -2 & 0 & 2 \\ -1 & 0 & 1 \end{bmatrix} \begin{bmatrix} x_1 & x_2 & x_3 \\ x_5 & x_6 & x_7 \\ x_9 & x_{10} & x_{11} \end{bmatrix} \right\| + \left\| \begin{bmatrix} 1 & 2 & 1 \\ 0 & 0 & 0 \\ -1 & -2 & -1 \end{bmatrix} \begin{bmatrix} x_1 & x_2 & x_3 \\ x_5 & x_6 & x_7 \\ x_9 & x_{10} & x_{11} \end{bmatrix} \right\|$$

The luminance $x_x$ of the destination pixel X can be further calculated a $$x_x = \mu x_5 + (1-\mu) x_6$$

where $$\mu = \frac{k(S_6)^2 + 1}{k((S_6)^2 + (S_5)^2) + 2}$$

and k is a user-defined parameter that is between 0 and 1.

The interpolation for the destination pixel Y is similar to the aforesaid steps of the interpolation for the destination pixel X except the calculation of the luminance $x_y$, when through cubic convolution interpolation, is a weighted average (or convolution) of different four neighboring pixels $P_1$, $P_5$, $P_9$ and $P_{13}$ and except the calculation of the luminance $x_y$, when through Sobel-based interpolation, is based on two Sobel gradients for different two neighboring pixels $P_5$ and $P_9$. The cubic convolution Interpolation kernel may be also obtained from Formula (a).

Moreover, the interpolation of the destination pixel Z is also similar to the aforesaid steps of the interpolation for the destination pixel X or Y except the interpolation for other transversal and longitudinal destination pixels must be first determined, so that the interpolation of the destination pixel Z can be performed by the aforesaid steps according to the Robert gradients and the Sobel gradients for both the neighboring pixels and the determined destination pixels.

Figure 3:
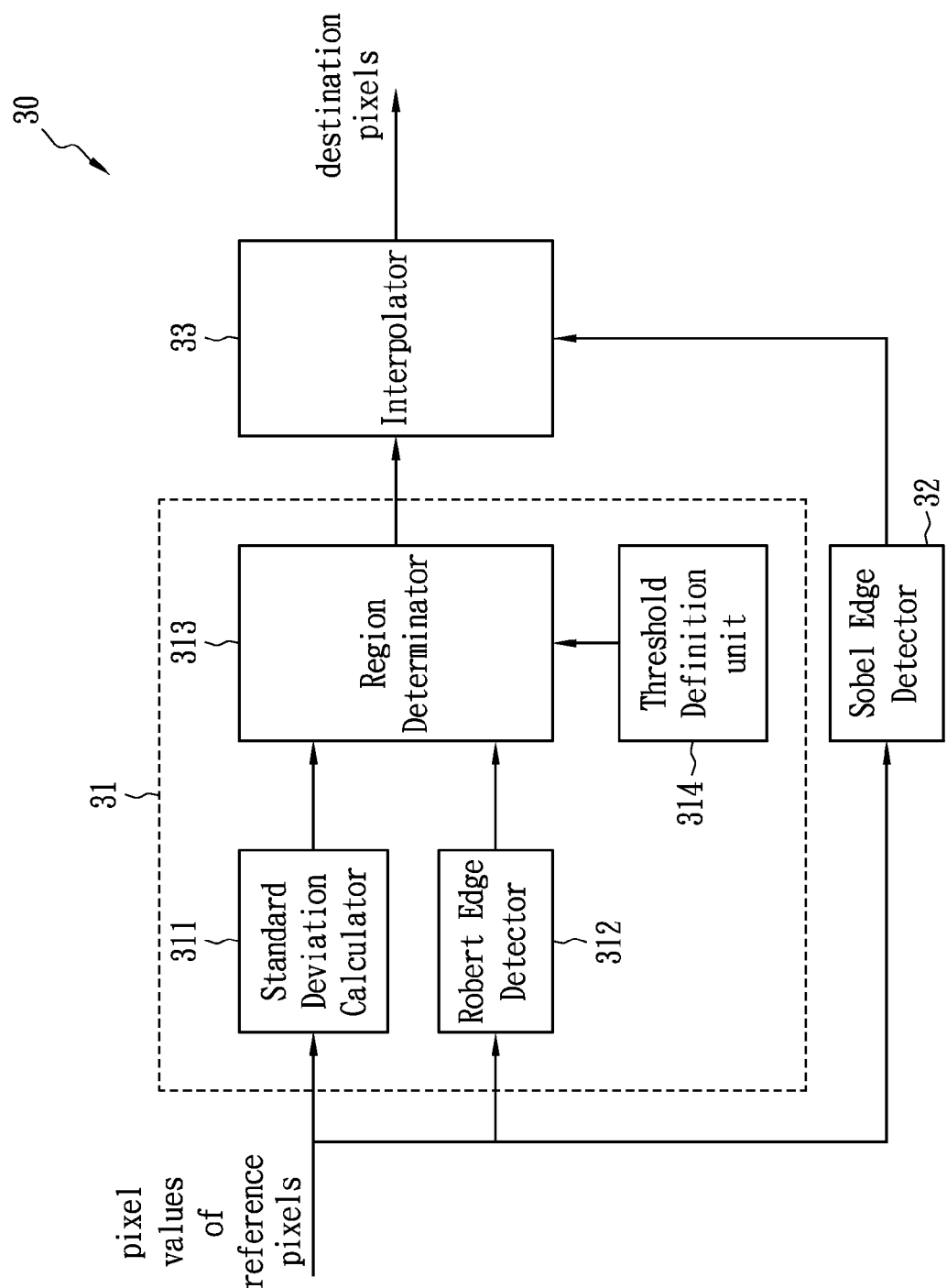
FIG. 3 is a block diagram of an edge-oriented interpolation system for a digital image in accordance with a preferred embodiment of the invention.

FIG. 3 is a block diagram of an edge-oriented interpolation system for a digital image in accordance with a preferred embodiment of the invention. The edge-oriented interpolation system 30 for a digital image comprises a region determination circuit 31, a Sobel edge detector 32 and an interpolator 33. The region determination circuit 31 identifies each destination pixel in an enlarged image as being located in a smooth region, a text region or an edge region of the digital image, and includes a standard deviation calculator 311, a Robert edge detector 312, a region determinator 313 and a threshold definition unit 314.

As an example, The standard deviation calculator 311 calculates the luminance standard deviation $\delta_y$ of a 4-by-4 matrix of reference pixels. The Robert edge detector 312 calculates Robert gradients $G_0$-$G_8$ for each 2-by-2 sub-matrix of the reference pixels $P_0$-$P_{15}$. The first threshold TH1, the second threshold TH2 and the third threshold TH3 are defined by a user through the threshold definition unit 314. The region determinator 313 identifies each destination pixel in an enlarged image as being located in a smooth region, a text region or an edge region of the digital image according to the output from the standard deviation calculator 311 and Robert edge detector 312, as mentioned above.

The interpolator 33 adaptively performs Sobel-based interpolation for the destination pixel or cubic convolution interpolation for the destination pixel with a given slope based on the identification for the destination pixel, as mentioned above. The Sobel edge detector 32 calculates two Sobel gradients for two neighboring pixels for use in the interpolator 33 when cubic convolution interpolation is performed, as mentioned above.

The above-described embodiments of the present invention are intended to be illustrative only. Numerous alternative embodiments may be devised by persons skilled in the art without departing from the scope of the following claims.

What is claimed is:

1. An edge-oriented interpolation method for a digital image, comprising the steps of:
   identifying each destination pixel, with a region determination circuit, as being located in a smooth region, a text region or an edge region of the digital image;
   performing Sobel edge detection, with a Sobel edge detector, for two neighboring pixels around the destination pixel to obtain two Sobel gradients;
   performing cubic convolution interpolation, with an interpolator, for the destination pixel with a first slope when the destination pixel is identified to be located in a smooth region;
   performing cubic convolution interpolation, with the interpolator, for the destination pixel with a second slope when the destination pixel is identified to be located in a text region, wherein the second slope is different from the first slope; and
   performing Sobel-based interpolation, with the interpolator, for the destination pixel with reference to the two Sobel gradients when the destination pixel is identified to be located in an edge region.

2. The edge-oriented interpolation method for a digital image of claim 1, wherein the identifying step further comprises the steps of:
   calculating a standard deviation for a matrix of reference pixels in the digital image; and
   calculating edge gradients for each sub-matrix of the reference pixels; and identifying the destination pixel as being located in the smooth region, the text region or the edge region of the digital image based on the standard deviation and the Robert gradients.

3. The edge-oriented interpolation method for a digital image of claim 2, wherein the edge gradients are obtained by Robert edge detection.

4. The edge-oriented interpolation method for a digital image of claim 2, wherein the destination pixel is identified as being located in the text region of the digital image if the standard deviation exceeds a first threshold and the number of edge gradients over a second threshold is larger than a third threshold.

5. The edge-oriented interpolation method for a digital image of claim 2, wherein the destination pixel is identified as being located in the edge region of the digital image if the standard deviation exceeds a first threshold and the number of edge gradients over a second threshold is not larger than a third threshold.

6. The edge-oriented interpolation method for an image of claim 2, wherein the location of the destination pixel is identified as being in a smooth region when the standard deviation does not exceed a first threshold.

7. The edge-oriented interpolation method for a digital image of claim 1, wherein the Sobel-based interpolation is of the form:

$$x_x = \mu x_p + (1-\mu) x_q$$

where $x_x$, $x_p$ and $x_q$ respectively represent values of the destination pixel and two neighboring pixels;
wherein $\mu$ is defined as:

$$\mu = \frac{k(S_q)^2 + 1}{k((S_q)^2 + (S_p)^2) + 2}$$

where $S_p$ and $S_q$ respectively represent Sobel gradients for the two neighboring pixels, and k is a user-defined parameter that is between 0 and 1.

8. The edge-oriented interpolation method for a digital image of claim 1, wherein the Cubic convolution interpolation is calculated as a weighted average of four neighboring pixels based on a Cubic convolution kernel, and the Cubic convolution kernel is a three-degree approximation to a sinc function:

$$w_k = \begin{cases} (a+2)|u|^3 - (a+3)|u|^2 + 1 & 0 \le |u| \le 1 \\ a|u|^3 - 5a|u|^2 + 8a|u| - 4a & 1 \le |u| \le 2 \\ 0 & 2 \le |u| \end{cases}$$

where u is the distance between the destination pixel and each of the neighboring pixels, and a is the slope or first derivative of the kernel at u=1.

9. An edge-oriented interpolation system for a digital image, comprising:
   a region determination circuit identifying each destination pixel as being located in a smooth region, a text region or an edge region of the digital image;
   a Sobel edge detector performing Sobel edge detection for two neighboring pixels around the destination pixel to obtain two Sobel gradients; and
   an interpolator adaptively performing cubic convolution interpolation with a given slope or Sobel-based interpolation employing the two Sobel gradients depending on the identification of the destination pixel by the region determination circuit as being located in the smooth region, the text region or the edge region of the digital image.

10. The edge-oriented interpolation system for a digital image of claim 9, wherein the interpolator performs cubic convolution interpolation for the destination pixel with a first slope when the region determination circuit identifies the destination pixel as being located in the smooth region, performs cubic convolution interpolation for the destination pixel with a second slope when the region determination circuit identifies the destination pixel as being located in the text region, the second slope being different from the first slope, and performs Sobel-based interpolation for the destination pixel with the two Sobel gradients when the region determination circuit identifies the location of the destination pixel as being located in the edge region.

11. The edge-oriented interpolation system for a digital image of claim 9, wherein the region determination circuit comprises a standard deviation calculator calculating a standard deviation of a matrix of reference pixels in the digital image, an edge detector calculating edge gradients for each sub-matrix of the reference pixels and a region determinator identifying the destination pixel as being located in the in the smooth region, the text region or the edge region of the digital image according to the output of the standard deviation calculator and the edge detector.

12. The edge-oriented interpolation system of claim 10, wherein the edge gradients are obtained by Robert edge detection.

13. The edge-oriented interpolation system for a digital image of claim 11, wherein the destination pixel is identified as being located in the text region of the digital image if the standard deviation exceeds a first threshold and the number of edge gradients over a second threshold is larger than a third threshold.

14. The edge-oriented interpolation system for a digital image of claim 11, wherein the destination pixel is identified as being located in the edge region of the digital image if the standard deviation exceeds a first threshold and the number of edge gradients over a second threshold is not larger than a third threshold.

15. The edge-oriented interpolation system for an image of claim 11, wherein the location of the destination pixel is identified as being in a smooth region when the standard deviation does not exceed a first threshold.

16. The edge-oriented interpolation system for a digital image of claim 9, wherein the interpolation performs Sobel-based interpolation as the following:

$$x_x = \mu x_p + (1-\mu) x_q$$

where $x_x$, $x_p$ and $x_q$ respectively represent values of the destination pixel and two neighboring pixels;
wherein $\mu$ is defined as:

$$\mu = \frac{k(S_q)^2 + 1}{k((S_q)^2 + (S_p)^2) + 2}$$

where $S_p$ and $S_q$ respectively represent Sobel gradients for the two neighboring pixels, and k is a user-defined parameter that is between 0 and 1.

17. The edge-oriented interpolation system for a digital image of claim 9, wherein the interpolation performs Cubic convolution interpolation as a weighted average of neighboring pixels based on a Cubic convolution kernel, and the Cubic convolution kernel is a three-degree approximation to a sinc function:

$$w_k = \begin{cases} (a+2)|u|^3 - (a+3)|u|^2 + 1 & 0 \leq |u| \leq 1 \\ a|u|^3 - 5a|u|^2 + 8a|u| - 4a & 1 \leq |u| \leq 2 \\ 0 & 2 \leq |u| \end{cases}$$

where u is the distance between the destination pixel and each of the neighboring pixels, and a is the slope or first derivative of the kernel at u=1.

18. The edge-oriented interpolation system of claim 13, wherein the region determination circuit further comprises a threshold definition unit for a user to define the above-mentioned thresholds.

19. The edge-oriented interpolation system of claim 14, wherein the region determination circuit further comprises a threshold definition unit for a user to define the above-mentioned thresholds.

20. The edge-oriented interpolation system of claim 15, wherein the region determination circuit further comprises a threshold definition unit for a user to define the above-mentioned thresholds.

* * * * *